United States Patent [19]

Benoit et al.

[11] Patent Number: 5,114,332

[45] Date of Patent: May 19, 1992

[54] MOLDING APPARATUS HAVING ELEMENTS MADE OF COMPOSITE MATERIAL

[75] Inventors: Joël M. D. Benoit, Cesson La Foret; Gilles J. M. Bessenay, Paris; Daniel G. Girault, Melun, all of France

[73] Assignee: Societe Nationale d'Etude et de Construction de Moteurs d'Aviation "S.N.E.C.M.A.", Paris, France

[21] Appl. No.: 659,569

[22] Filed: Feb. 22, 1991

[30] Foreign Application Priority Data

Feb. 23, 1990 [FR] France .................. 90 02237

[51] Int. Cl.$^5$ .................. B29C 43/00; B30B 15/00
[52] U.S. Cl. .................. 425/407; 100/93 P; 156/583.1
[58] Field of Search .......... 100/93 P; 156/583.1, 156/583.4; 425/143, 144, 406, 407

[56] References Cited

U.S. PATENT DOCUMENTS

| | | | |
|---|---|---|---|
| 2,420,003 | 5/1947 | Miller | 249/167 |
| 3,294,878 | 12/1966 | Carnall, Jr. et al. | 425/407 |
| 3,555,597 | 1/1971 | Meadows | 425/407 |
| 3,982,992 | 9/1976 | Moffitt | 156/583.4 |
| 4,240,780 | 12/1980 | Carcey | 425/407 |
| 4,338,068 | 7/1982 | Suh et al. | 425/144 |
| 4,505,184 | 8/1978 | Sumitomo | 264/337 |
| 4,563,145 | 1/1986 | de Meij | 425/407 |
| 4,586,690 | 5/1986 | Hartel et al. | 425/144 |
| 4,855,011 | 8/1989 | Legge et al. | 100/93 P |
| 4,888,973 | 12/1989 | Comley | 100/93 P |

FOREIGN PATENT DOCUMENTS 835789  6/1981  U.S.S.R. .................. 100/93 P

*Primary Examiner*—Jay H. Woo
*Assistant Examiner*—C. Scott Bushey
*Attorney, Agent, or Firm*—Oblon, Spivak, McClelland, Maier & Neustadt

[57] ABSTRACT

A molding apparatus for the hot pressing of parts made of refractory material includes at least one element, such as a mold or an intermediate element, which is formed by a material capable of withstanding high temperatures, having adequate mechanical resistance and possessing particular anisotropic properties of thermal conductivity, in particular as a result of a structure including thermally conductive fibers oriented so that a preferential heat transfer occurs towards the areas of the part which are furthest away from its edges of the part, ensuring homogeneous heating or cooling throughout the part at all times.

7 Claims, 1 Drawing Sheet

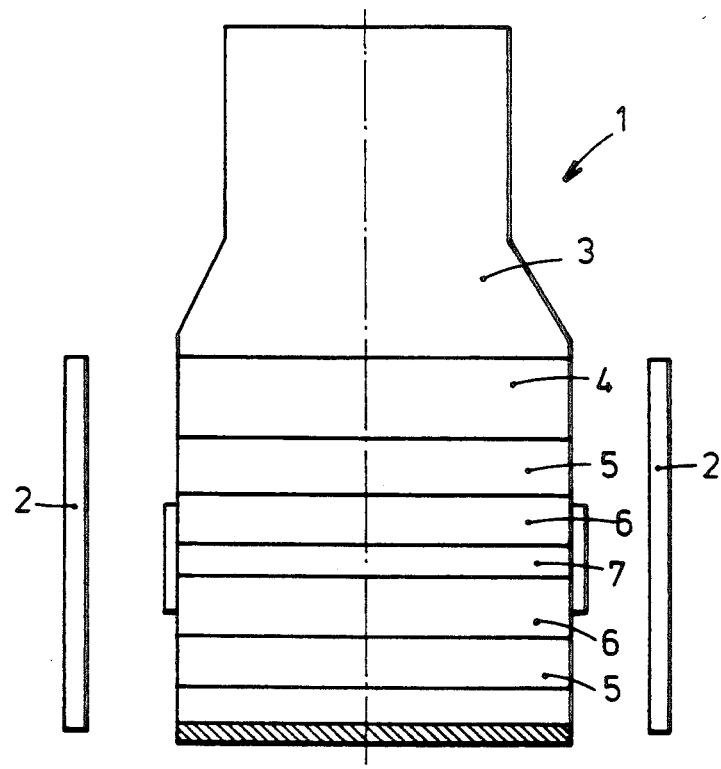
FIG:1
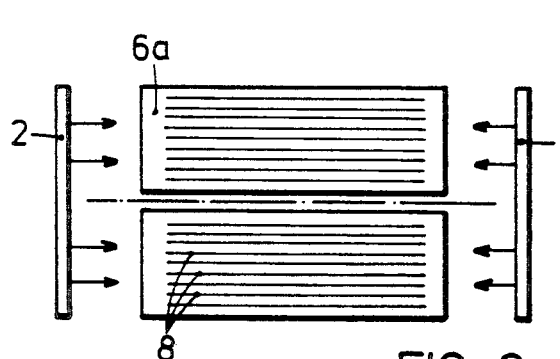
FIG:2
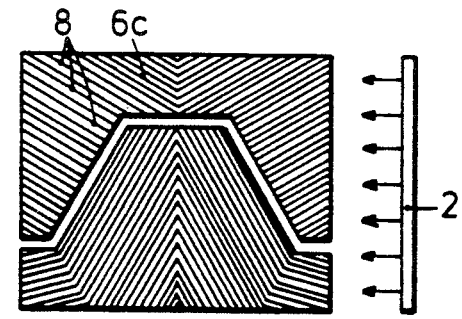
FIG:3
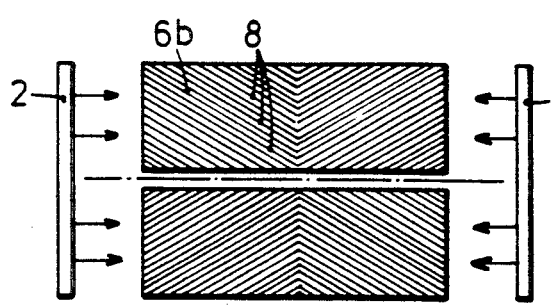
FIG:4
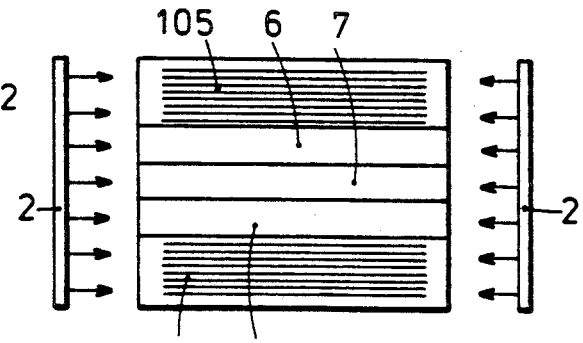
FIG:5

MOLDING APPARATUS HAVING ELEMENTS MADE OF COMPOSITE MATERIAL

BACKGROUND OF THE INVENTION

1. FIELD OF THE INVENTION

The invention relates to molding apparatus for the hot pressing of parts made of a refractory material.

Known processes for shaping parts made of refractory materials, especially composite materials, and in particular parts made of ceramic materials intended for use in aircraft engines, generally involve a hot pressing operation which can be carried out in a press furnace at high temperature. Various heating means may be used for these furnaces, whether for radiant heating, or for induction heating, possibly with a susceptor, the heat being propagated from the outside towards the center.

2. Description of the Prior Art

Traditionally, the pressing assembly proper is realized in accordance with a so-called monobloc concept, in which the blank of the part to be obtained is placed between two dies which, for applications requiring temperatures ranging, for example, between 1200° C. and 2200° C. and the enclosure to be placed in a vacuum or a neutral atmosphere, are made of graphite. However, during high temperature heating tests (at 1400° C. for example) on refractory materials, it is possible to observe differences of temperature in excess of 200° C. between the outer edge and the center of the part. This radial thermal gradient is generally unacceptable for the quality of the parts to be obtained. Attempting to obtain temperature uniformity by insulation leads to excessively prolonging the duration of the cycle and, anyway, makes it impossible to achieve the necessary cooling rates after pressing, which in certain cases may reach some 1200° C. per hour in order to obtain conditions equivalent to oil hardening.

Complying with these cooling rates leads to providing a separate mold which receives the blank and which permits pressing between the dies of the press-furnace as described above. In this case, the mold containing the pressed material may be removed from the furnace and rapidly cooled.

The techniques now used, for example, for shaping parts made of composite ceramic materials of the type comprising SiC fibres in a glass matrix and for the associated temperature ranges and conditions of operation (enclosure in a vacuum or neutral atmosphere), comprise the use of dies and a separate mold of graphite.

However, tests have shown that the thermal gradients, particularly in a radial direction, between an outer edge and the center, remain too high and incompatible with satisfactory implementation corresponding to the quality criteria of the results to be obtained.

French Specification No. 2 532 585 discloses an example of controlling the temperatures of a mold used for hot pressing with a view to obtaining uniformity of the mold temperatures. However, this solution, which uses a mold of electrically-conductive material associated with heating means involving a travelling wave field generator, is limited to low-temperature applications, particularly in the field of rubber. This field is far removed from the aims of the present invention, particularly from the point of view of the characteristics of the material worked and the thermal conditions employed.

SUMMARY OF THE INVENTION

It is an object of the invention to provide molding apparatus for the hot pressing of parts made of a refractory material which enables the above-mentioned conditions of use to be met without suffering the drawbacks of the known solutions.

To this end, according to the invention, the molding apparatus includes at least one element formed of a composite material which is resistant to high temperatures, said composite material comprising long, thermally conductive refractory fibers disposed in a refractory matrix which is less thermally conductive than said fibers, said fibers being oriented so as to ensure heat transfer, in one direction or the other, towards the areas of said part furthest from its outer edges, thereby enabling homogeneous heating or cooling to be achieved throughout said part at all times, the arrangement of said fibers also being such that said element possesses adequate mechanical resistance to compression stresses.

As will be appreciated, the construction of the element is such that it will improve both the heating and the cooling of the regions of the part furthest from its outer edges.

The fiber of the element are preferably carbon based, and preferably the element is constituted either by the mold itself or by intermediate elements cooperating with a conventional mold of isotropic material.

Other features and advantages of the invention will become apparent from the following description of preferred embodiments of the invention with reference to the attached drawings.

BRIEF DESCRIPTION OF THE DRAWINGS

FIG. 1 is a diagrammatic view of an assembly for the hot pressing of parts comprising a first embodiment of molding apparatus in accordance with the invention.

FIGS. 2, 3 and 4 are diagrammatic sectional views of examples of hot pressing molds formed in accordance with the invention.

FIG. 5 is a diagrammatic sectional view of part of a second embodiment of molding apparatus in accordance with the invention.

DESCRIPTION OF THE PREFERRED EMBODIMENTS

A hot pressing assembly 1 is shown in FIG. 1 suitable for use in carrying out shaping operations on parts, particularly parts made of composite ceramic material, such as parts comprising SiC fibers in a glass matrix intended for use in aircraft engines. The assembly 1 is associated with heating means indicated at 2 and comprises jack operated pressing means 3 associated with thermal insulation elements 4 and acting on dies 5. Between the dies 5 a pressing mold 6 is placed which contains a blank 7 for the part to be obtained.

In accordance with a first embodiment of the invention, the pressing mold 6 is formed of a material having anisotropic thermal conductivity properties. This material, particularly in the case referred to above involving the shaping of parts made of composite material comprising SiC fibers in a glass matrix, may be a composite material of the carbon/carbon type having carbon fibers in a carbon matrix. The thermal conductivity parallel to the strata of such a material may be one hundred times higher than in the perpendicular direction.

FIGS. 2 and 3 show examples of pressing molds for use in the shaping of flat axisymmetrical plates. In FIG.

2 the fibers 8 of the pressing mold 6a are oriented parallel to the median Plane of the plate, the structure of the material of the mold 6a in this case being termed bidimensional. FIG. 3 illustrates the use of a material of more complex structure, termed n-dimensional, for the pressing mold 6b.

In all cases, the orientations of the thermally conducting fibers 8 may be adapted to the particular shape of the part to be obtained, such as shown in FIG. 4 by the pressing mold 6c for the shaping of an axisymmetrical part.

In all cases, the thermal anisotropy of the material constituting the pressing molds 6 permits a preferential heat transfer from the heating means 2 towards the areas of the part to be shaped furthest from the heating means 2. The same phenomenon also occurs when the part cools down, in this case favoring the removal of heat from the areas of the mold furthest away from the outer edges of the part.

In a second embodiment of the invention, which may be preferred in cases where, depending on the application, it is desired to retain a mold of conventional form made from a material having isotropic properties, intermediate elements of the molding apparatus, such as the dies 105 of the molding apparatus diagrammatically shown in FIG. 5, have a structure similar to that just described for the mold 6 of the first embodiment illustrated in FIGS. 1 to 4. In this case it is the intermediate elements 105 which have controlled conductivity properties and which are made of a composite material comprising heat conducting refractory fibers disposed in a refractory matrix of lower thermal conductivity than the fibers, said fibers being orientated so as to ensure preferential heat propagation, in one direction or the other, towards or away from the areas of the parts furthest from its outer edges. As before, this arrangement permits homogeneous heating or cooling of the entire part 7 to be achieved at all times during the working of the part.

In all cases, and irrespective of the particular embodiment selected, the choice of the arrangement and orientation of the fibers 8, as illustrated in particular in FIGS. 2, 3 and 4, takes into account the criterion that the element 6a, 6b, 6c or 105 should possess adequate mechanical resistance to compression stresses during the shaping operation. A compromise is thus sought between this strength requirement and the thermal results to be obtained.

By reducing the thermal heterogeneity of the molded part, both during heating and hot pressing and during cooling, the use of a mold or intermediate elements in molding apparatus of the invention as described above enables a substantially uniform microstructure to be obtained throughout the material of the part finally obtained. In addition, by limiting the thermal gradients in the part during processing, the residual stresses in the material of the finished part are also reduced.

The molds or intermediate elements of molding apparatus in accordance with the invention as just described may be made using known techniques, particularly wire reeling, filament winding or fabric stacking.

Apart from composite materials of the carbon/carbon type, possibly employing graphite or pyrolitic graphite, which have been used for making molds for carrying out hot pressing operations in a neutral atmosphere or under vacuum, it is also possible to envisage using composite materials of the carbon/carbon type for applications involving operation in an oxidizing or reducing atmosphere when the materials have been subjected to an anti-oxidizing impregnation and/or to a vapor phase deposition of a protective refractory material, for example a SiC base. Alternatively, a composite material may be used comprising carbon fibers in a refractory matrix of the SiC type. More generally, depending upon the applications and the conditions of use envisaged, the choice of material may involve any composite material having long, heat-conducting, refractory fibers and a non-oxidizing matrix, the orientation of the said fibers being arranged in the particular manner described above in accordance with the invention.

We claim:

1. Molding apparatus for the hot pressing of a part made of a refractory material in a press-furnace having heating means and external cooling means for cooling said part, which comprises:

at least one element formed of a composite material which is resistant to high temperatures, said composite material comprising fibers uninterrupted from one side to another of said element and disposed in a refractory matrix which is less thermally conductive than said fibers, said fibers being oriented so as to ensure heat transfer, in one direction or the other, towards areas of said part furthest from its outer edges, thereby enabling homogenous heating or cooling to be achieved throughout said part of all times, an arrangement of said fibers also being such that said element possesses mechanical resistance to compression stresses.

2. Molding apparatus according to claim 1, wherein said composite material comprises carbon fibers disposed in a carbon matrix.

3. Molding apparatus according to claim 1, wherein said composite material comprises carbon fibers disposed in a refractory matrix of a silicon carbide base.

4. Molding apparatus according to claim 1, wherein said element comprises a protective coating for use in a predetermined atmosphere.

5. Molding apparatus according to claim 1, wherein said element comprises a separate mold member which contacts said part directly.

6. Molding apparatus according to claim 1, wherein said apparatus comprises a mold member which is made of an isotropic material for contacting said part, and said element comprises an intermediate element in direct contact with said mold member.

7. Molding apparatus according to claim 4, wherein said protective coating comprises a silicon carbide base.

* * * * *